United States Patent [19]

Ruinet

[11] Patent Number: 5,483,245
[45] Date of Patent: Jan. 9, 1996

[54] ILS SIGNAL ANALYSIS DEVICE AND METHOD

[75] Inventor: Jean-Marc Ruinet, Denee, France

[73] Assignee: Kollmorgen Artus, Avrille, France

[21] Appl. No.: 110,932

[22] Filed: Aug. 24, 1993

[30] Foreign Application Priority Data

Aug. 26, 1992 [FR] France .................. 92 10290

[51] Int. Cl.[6] ........................ G01S 1/16
[52] U.S. Cl. ............. 342/410; 342/411; 342/413; 364/429
[58] Field of Search ............ 342/407, 408, 342/410, 411, 413; 364/429

[56] References Cited

U.S. PATENT DOCUMENTS

| 4,301,455 | 11/1981 | Yetter | 342/398 |
|---|---|---|---|
| 4,414,632 | 11/1983 | Murrell | 364/487 |
| 4,415,899 | 11/1983 | Vogel et al. | 342/413 |
| 4,586,049 | 4/1986 | Davidson | 343/414 |
| 4,609,921 | 9/1986 | Flynn | 343/411 |
| 4,728,957 | 3/1988 | Hethuin | 342/401 |

FOREIGN PATENT DOCUMENTS 2596547 10/1987 France .

Primary Examiner—Thomas H. Tarcza
Assistant Examiner—Dao L. Phan
Attorney, Agent, or Firm—Staas & Halsey

[57] ABSTRACT

The invention relates to an instrument landing system (ILS) signal analysis device including an analog/digital converter receiving the composite signal to be analyzed and delivering a succession of values which can be processed in digital form, the signal to be analyzed being furthermore applied to a phase-locking unit which delivers for the analog/digital converter a sampling signal of frequency greater than the largest frequency of the components of the signal to be analyzed, the digital processing of the values from the converter, carried out in real time between two sampling instants, allowing determination of the parameters for modulation of the ILS signal.

The phase-lock loop is synchronized with the frequency of the signal to be analyzed, which frequency is extracted from a sub-harmonic of the 90 Hz and the 150 Hz components constituting this signal.

10 Claims, 7 Drawing Sheets

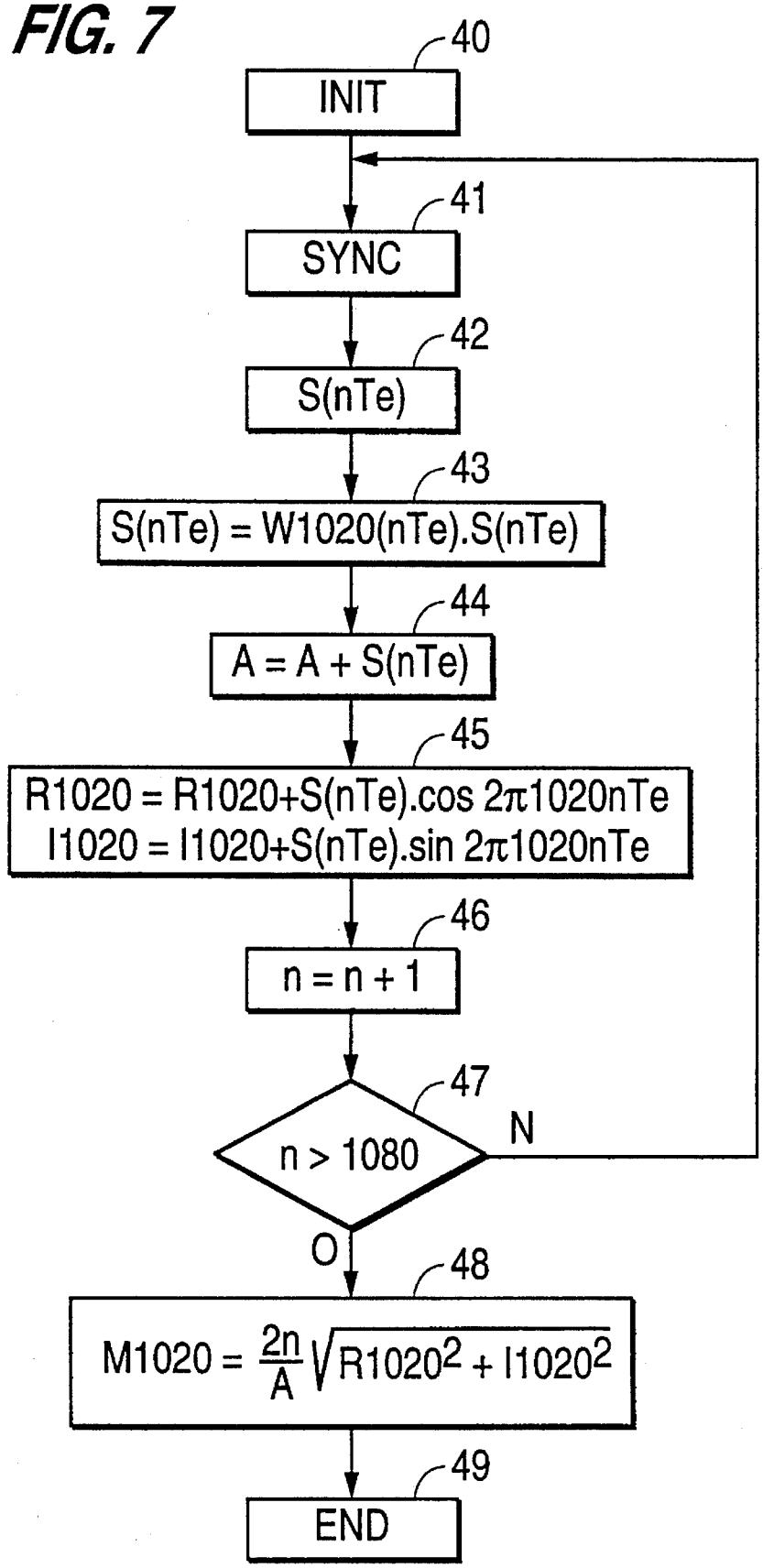

ILS SIGNAL ANALYSIS DEVICE AND METHOD

BACKGROUND AND SUMMARY OF INVENTION

The present invention relates to a method and a device for analysing landing system signals known as ILS "Instrument Landing System" signals. The device is intended in particular for the ground control of all the characteristics of instrument landing installations.

In French Patent Application FR-A-1 487 441, the Applicant has described a method of measuring an ILS signal implementing an analog technique evaluating the deviation of the aircraft with respect to the landing path, from the determination of the difference in modulation existing between the two components, 90 and 150 Hz, constituting the composite ILS signal.

The French Patent Application FR-A-2 596 547 shows a device for formulating radionavigation information relying, in one embodiment, on a digital architecture implementing a microprocessor assembly at the level of which the ILS signal is processed with an algorithm calling upon a recursive fast Fourier transform calculation.

These two requirements, which describe devices intended to serve as on-board navigation receivers, give rise to constraints distinct from that of a device for measurement and analysis; in particular, they necessitate integration of the flaws due, among other things, to the obstacles which may appear in the landing path, so as to prevent any tacking during approach. This "smoothing" of the information only allows small data renewal rates which, however, permit recourse to processing operations such as the recursive fast Fourier transform which demands long observation times.

By contrast, in an analysis device such as that of the invention, it is essential to be able to assess all the imperfections of the system to be controlled, this requiring particularly fast response times.

One purpose of the invention is to produce a measurement device having high performance, that is to say great accuracy and a not lower processing speed.

Another purpose of the invention is to produce a simple and compact device employing a restricted number of components and thereby permitting fast and reduced maintenance.

These purposes are achieved with an instrument landing system (ILS) signal analysis device including an analog/digital converter receiving the composite signal to be analysed and delivering a succession of values which can be processed in digital form, characterized in that the said signal to be analysed is furthermore applied to phase-locking means which deliver for the said analog/digital converter a sampling signal of frequency greater than the largest frequency of the components of the signal to be analysed, the digital processing of the values from the converter, carried out in real time between two sampling instants, allowing determination of the parameters for modulation of the ILS signal.

The phase-lock loop is synchronized directly with the frequency of the signal to be analysed, which frequency is extracted from a sub-harmonic of the 90 Hz and 150 Hz components constituting this signal.

This specific architecture allows the calculation procedure, implemented at the level of the digital processing assembly, to be synchronized directly with the composite ILS signal so as constantly to assess the maximum amplitude of the 90 and 150 Hz components which is contained in this ILS signal, and this despite the frequency or phase drift existing at the level of the signal or despite its distortion factor. Furthermore, the instantaneous processing between each sample of the numerical values acquired makes it possible to limit the memory capacity of the device and thus to afford it maximum compactness.

The digital processing of the values from the converter is carried out by a processing unit with which are associated a random-access memory, a non-volatile memory and an input/output module.

The non-volatile memory includes a first table in which are written numerical values corresponding to the value of a weighting window function for each sampling instant, as well as at least two tables in each of which are written numerical values representative, over a quarter period, of a cosine function of frequency equal to that of a characteristic component of the signal to be analysed.

Recourse to these tables of values avoids calculation, for each sample acquired, of the values of the functions employed in the calculation procedure.

Preferably, for the processing of the identification signal contained in the ILS signal, the analysis device according to the invention includes a digital filter using a weighting function whose equation is given by:

$$W(t) = 2 \frac{\sin k'\theta}{\theta} [\alpha + (1-\alpha)\cos\theta] \text{ with } \theta = \frac{2\pi t}{T}$$

where T represents the duration of observation of the signal to be analysed and k' and $\alpha$ are specified numerical coefficients.

The choice of this window (and in particular with k'=4 and $\alpha$=0.54) makes it possible to obtain a filter having a very selective and quasi-linear frequency response in the passband.

As before, this weighting window is advantageously stored in a non-volatile memory in the form of a table of numerical values.

The device according to the invention is implemented in accordance with a method including the following steps:

a) acquisition of a sample S(nTe) of the ILS signal to be analysed by the analog/digital conversion of this signal, Te representing the sampling period and n being an integer number, the sampling frequency being greater than the largest of the frequencies k of the components of the signal to be analysed, b) multiplication of the value of the sample taken by a first numerical value corresponding to the value of a weighting window function at the acquisition instant:

$$S(nTe) = Fen(nTe) \times S(nTe)$$

c) determination, at the frequencies k of the characteristic components of the ILS signal, of the real and imaginary parts of the spectrum of the sampled and weighted signal S(t):

$$R(k) = R(k) + S(nTe) \times \cos 2\pi k\, nTe$$

and $$I(k) = I(k) + S(nTe) \times \sin 2\pi k\, nTe$$

d) repetition of steps a) to c) for all of the samples over a duration of observation T of the ILS signal, e) calculation of the modulation factors for the characteristic components of the ILS signal.

$$M(k) = \frac{2}{HF} \sqrt{R^2(k) + I^2(k)},$$

HF being the average value of S(nTe) calculated over all the samples taken.

f) calculation of the difference (DDM) and sum (SDM) of the modulations (M (90) and M(150)) of the 90 and 150 Hz components of the ILS signal:

$SDM=M(90)+M(150)$ and $DDM=M(90)-M(150)$.

By performing the above calculations on numerous samples, advantageously 540, the effect of the analog or quantization noise becomes virtually nil. Moreover, measurement of the amplitude of each component of the signal is effected selectively about each frequency, this having the effect of further limiting the wide band noise.

In a particular embodiment, it is possible to take just one sample of the signal to be analysed every second or third value from the tables of the cosine function, thereby making it possible to determine also the amplitude of the 2nd or 3rd harmonic components of this signal.

Other characteristics and advantages of the present invention will emerge better on reading the following description given, by way of non-limiting illustrative example, in connection with the attached drawings in which:

BRIEF DESCRIPTION OF THE DRAWINGS

FIG. 7 is a flow chart describing the processing of the identification signal in the device according to the invention.

DESCRIPTION OF THE PREFERRED EMBODIMENT

Figure 1:
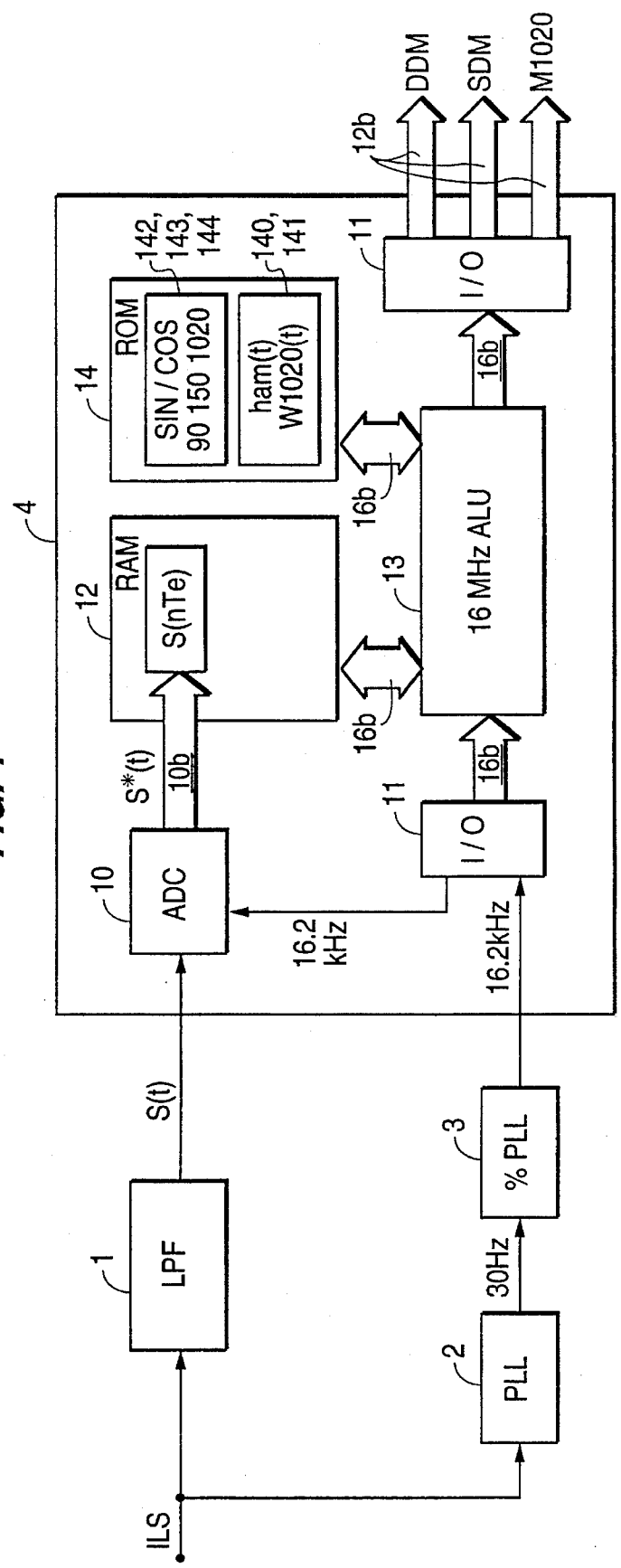
FIG. 1 shows the structure of an ILS signal analysis device according to the invention.

It is known that, in an instrument landing system, two transmitters are employed; one, at the frequency 110 MHz, known as the localizing signal or "localizer" and emitting a beam 2.5° wide on either side of the axis of the landing strip, and the other, at the frequency 332 MHz, known as the "glide-path" signal and emitting a beam 0.7° wide about a-typical 3° glide path.

In practice, these beams each consist of the zone common to two low-frequency modulated main beams, one at 90 Hz the other at 150 Hz. The resulting ILS signal therefore in theory assumes the form of a high-frequency signal (110 or 332 MHz) amplitude modulated by two 90 and 150 Hz sinusoidal voltages.

In the particular case of the localizing ILS signal, a 1020 Hz identification signal is furthermore superimposed on the 90 and 150 Hz components.

FIG. 1 is a preferred illustrative embodiment of a device for processing such ILS signals, according to the invention.

This ILS signal constitutes an input signal, on the one hand, for an anti-aliasing low-pass filter 1 and, on the other hand, for phase-locking means consisting of a phase-lock loop (PLL)2 whose output is connected to a frequency synthesizer 3. Output from the low-pass filter and from the synthesizer 3 constitute inputs for a digital processing assembly 4.

In a known manner, a phase-lock loop consists of a phase comparator whose output controls a voltage-controlled oscillator (VCO) which in turn feeds back to the input of the comparator. In the context of the present invention, the synchronizing of this circuit is carried out, not with a fundamental frequency of the analysed signal, as is frequently done, but with a sub-harmonic of this signal. In this instance, this is the 3rd sub-harmonic of the 90 Hz signal or the 5th sub-harmonic of the 150 Hz signal, that is to say the 30 Hz frequency.

Likewise in a known manner, a frequency synthesizer takes the form of a phase-lock loop into which a programmable divider is inserted within the feedback circuit.

In the example of the invention, the programmable divider is a divider by 540 making it possible to obtain a frequency of 16.2 kHz at the output of the synthesizer 3 from the stable frequency of 30 Hz provided by the phase-lock loop 2. This sampling frequency is greater than the highest frequency of the components of the signal to be analysed. Advantageously, in a ratio at least 1 to 10 for the identification signal and at least 1 to 100 for the 150 Hz component.

The processing assembly 4 includes an analog/digital converter 10 which receives the ILS signal from the anti-aliasing filter 1 and delivers on 10 bits a sampled signal S*(t) clocked by a sampling signal delivered by an input/output module 11. The result of this conversion is stored in a random-access memory 12 which is connected to a processing unit 13, which is also connected to a non-volatile memory 14.

The input/output module 11 which receives the 16.2 kHz synchronization signal generated by the frequency synthesizer 3 is connected to the processing unit 13 and also delivers signals for exploitation of the analysed ILS signal.

The transfers of information between the processing unit and its associated circuits, memories 12, 14 or input/output module 11, are advantageously carried out on 16 bits.

The non-volatile memory contains a program for managing all the processing as well as several tables of values, the utility of which will emerge hereafter, in connection with FIGS. 2 to 9 which explain the operation of the processing unit according to the invention.

FIGS. 2 and 3 show the various operations performed, by the processing assembly, on the signal both in the time domain and in the frequency domain.

Figure 2A:
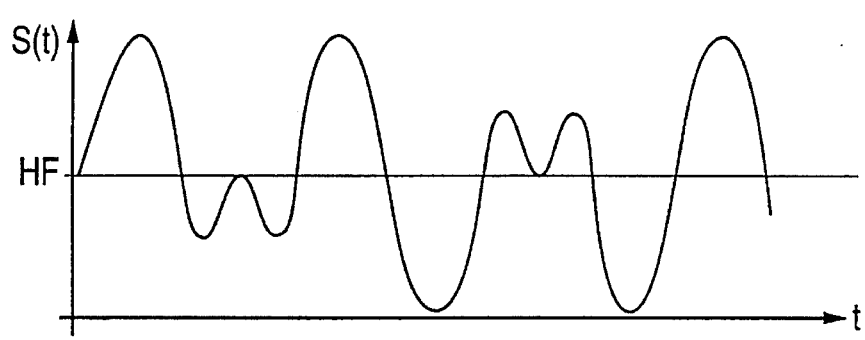
FIGS. 2a to 2e, 3a to 3e and 4 are a graphical approximation making it possible to observe the transformations carried out on the ILS signal in the time domain and in the frequency domain as well as the relations between these two domains.
Figure 2B:
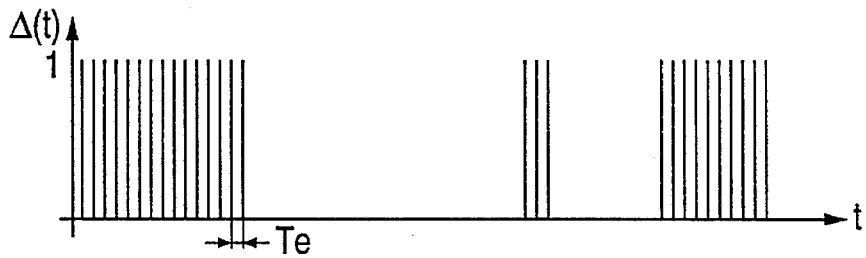
Figure 2C:
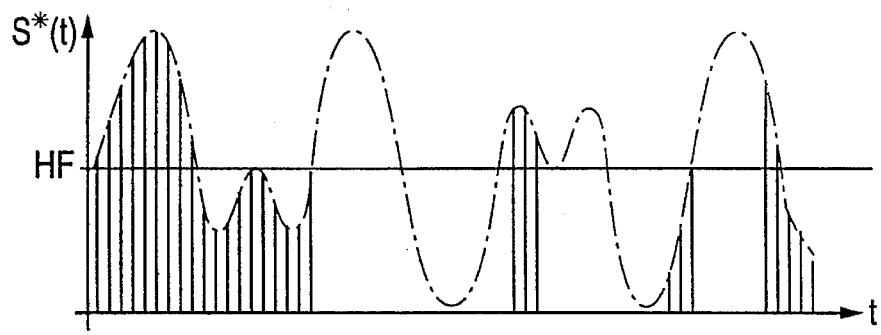

FIG. 2a shows the ILS signal on input to the device according to the invention. By way of instruction, the analysed signal is the localizing signal which contains only the 90 Hz and 150 Hz components to the exclusion of the 1020 Hz identification signal. However, it is obvious that a comparable analysis may be conducted with the localizing system whose demodulated signal would then also yield this 1020 Hz signal. Furthermore, the signal will firstly be assumed to be complete, without harmonics.

The form of the demodulated signal is given by the following equation:

$$S(t)=HF(1+M90 \sin 2\pi.90.t+M150 \sin 2\pi.150.t)$$

with HF the continuous component reflecting the 332 MHz high-frequency carrier on which the sum of the 90 Hz and 150 Hz waves is superimposed, M90 the modulation factor for the 90 Hz wave, M150 the modulation factor for the 150 Hz wave.

These modulation factors serve to reconstitute the difference of the modulations (DDM) and the sum of the modulations (SDM), which parameters, in the case of the former, characterizes the position of the aircraft with respect to the glide path (tracking path) and, in the case of the latter, serves in the validation of this previous measurement.

The sampling of the signal S(t) at a sampling frequency Fe=1/Te is achieved by multiplying this signal by a Dirac comb Δ(t) of period Te (see FIG. 2b) namely S*(t)=S(t)×Δ(t) (FIG. 2c), S* being a sequence of values of S(t) taken at the instants nTe.

Figure 3A:
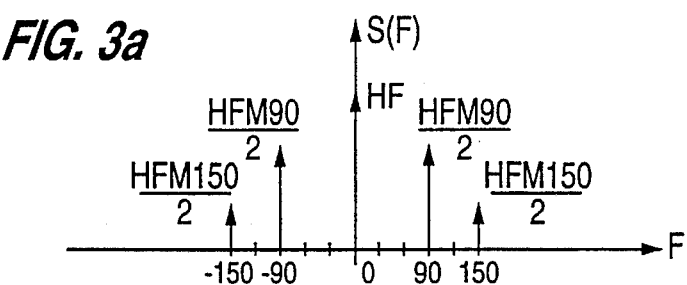
Figure 3B:
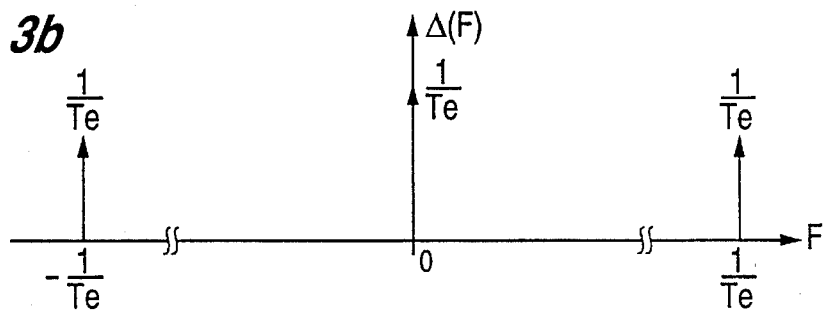
Figure 3C:
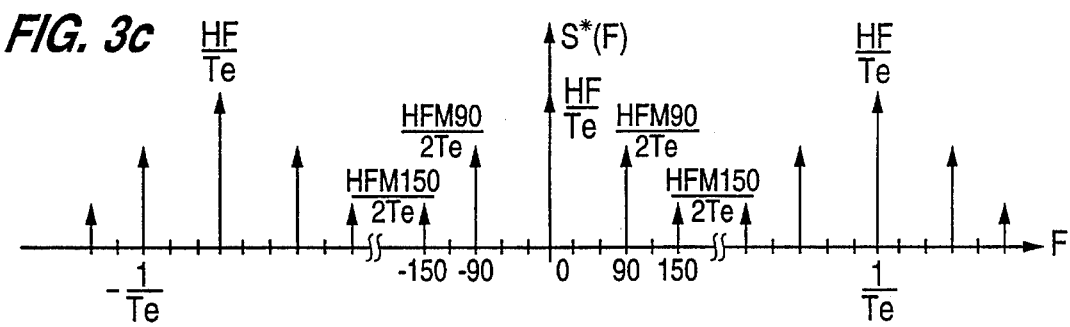

In the frequency domain, this sampling corresponds to a convolution between the signal S(F) (FIG. 3a) and the signal Δ(F) (FIG. 3b), which gives a spectrum S*(F) which is the repeat of S(F) about the multiple frequencies of Fe (see FIG. 3c).

It can then be seen that in order to sample, without losing information, this signal S(t) whose spectrum is bounded by a maximum frequency Fm; it is absolutely necessary for the sampling frequency Fe to be greater than 2Fm.

However, it must be certain that the spectrum of S(t) is bounded by this value Fm, now, this signal is subjected to fast variations and multiple interference depending on the configuration of the strip at the time of landing. This is why, in order to avoid these disadvantages, the sampling has been preceded by a low-pass filter which necessarily limits the spectrum to Fm, thus avoiding any undesired disturbances; this is the anti-aliasing filter 1. The frequency spectrum output by this filter is identical to that of S(t) and it is this signal, and not S(t), which is in reality the subject of the aforesaid sampling.

Figure 2D:
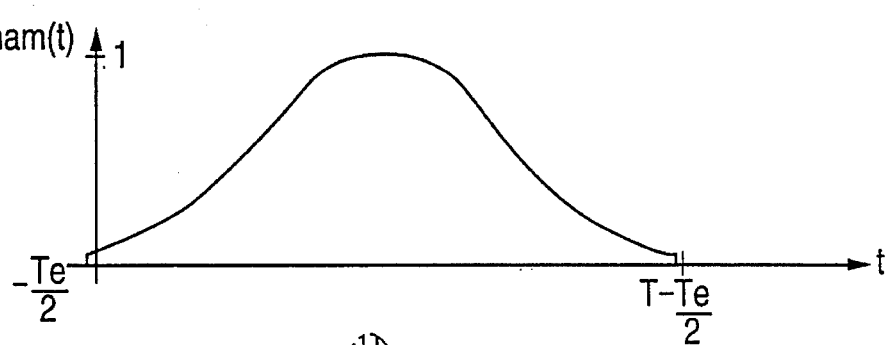
Figure 3D:
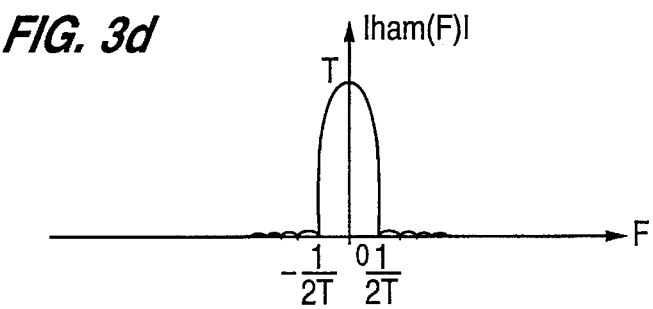

FIGS. 2d and 3d represent respectively in the time domain and in the frequency domain a weighting function known as a Hamming window.

The sampling may not be carried out over the whole of the signal S(t), that is to say for an infinite number of samples corresponding to an infinite signal observation time. The number of samples must be finite. This limitation reduces the period of observation to a value T, this being equivalent to multiplying the sampled function S*(t) by a window function of width T. So as to reduce the effects due to this truncation, it is advisable to resort to a specific window such as the Hamming window which, in respect of its frequency spectrum, has secondary side lobes of very small amplitudes, the main lobe having a width of 1/T.

This window function is defined by the following equation:

$$\text{ham}(t) = a + (1-a)\cos\left(2\pi \frac{t}{T} - \pi\right)$$

Preferably, the value 0.54 will be chosen for α, without however being limited to this value alone (the value α=0.5 which corresponds to a Harm window could, for example, also be envisaged).

Figure 2E:
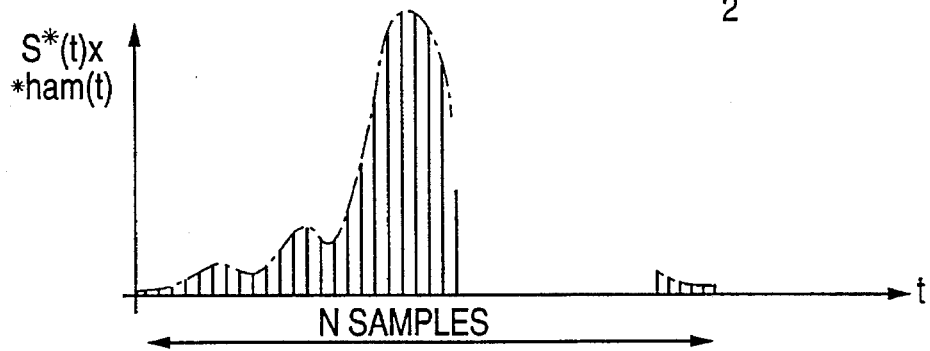
Figure 3E:
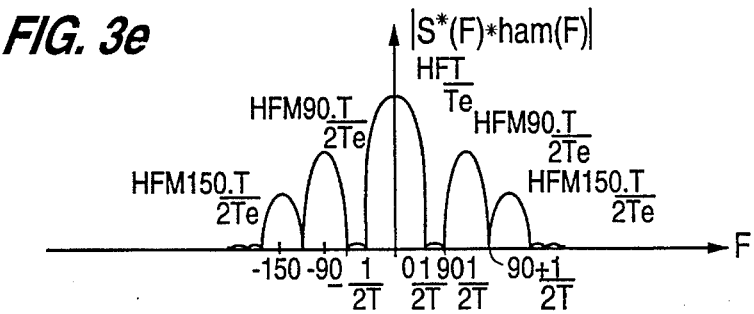

FIGS. 2e and 3e show the shape of the signal S(t) after sampling and truncation and that of the corresponding spectrum.

The latter is given by the convolution of the spectrum of the sampled signal S*(F) and of the spectrum of the ham window (F) namely: S*(F)* ham (F). In the frequency domain, this convolution amounts to repeating the ham spectrum (F) about the various frequencies of the spectrum S*(F). It can then be seen that, in order to avoid losing any information and achieve complete selection of the 90 and 150 Hz frequencies, it is necessary that the frequency width of the spectrum of the weighting window should not be greater than 60 Hz. In the case of the present invention, this would imply a theoretical observation of the signal for 16.6 ms $$\left(\frac{1}{2T} = 30 \text{ Hz, namely } T = \frac{1}{60} \text{ seconds}\right),$$

namely one half-period of the ILS signal which has a periodicity of 33.3 ms (30 Hz).

Figure 4:
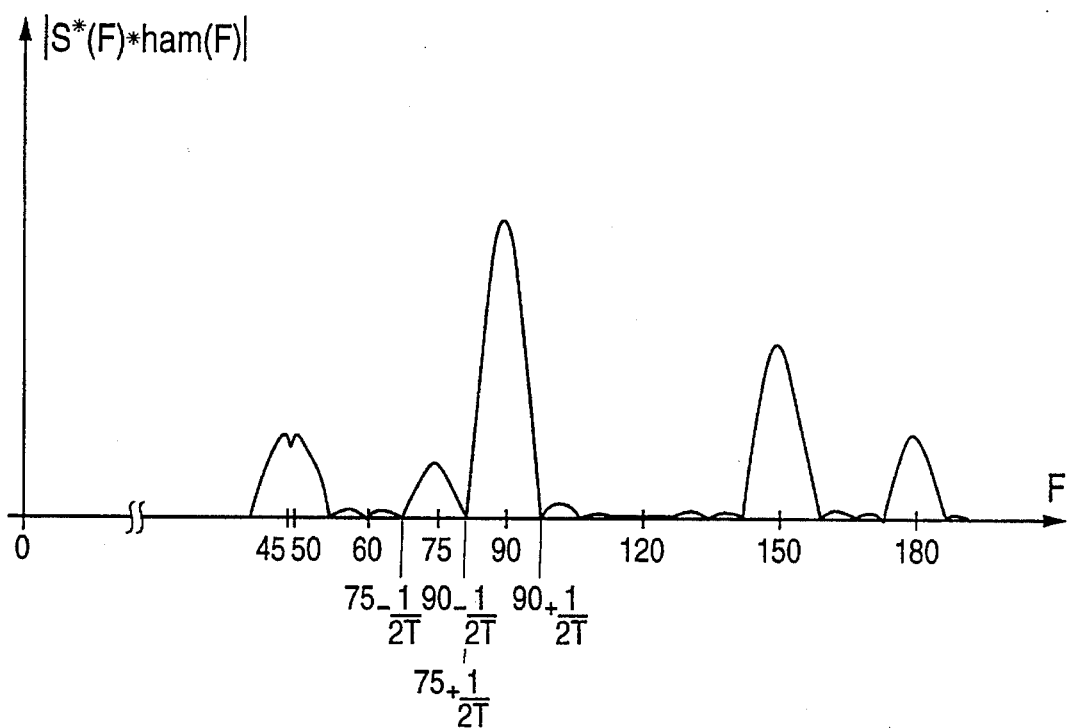

In practice, it will however be otherwise. Indeed, owing to flaws present in respect of the modulation and generation of the 90 and 150 Hz signals, the ILS signal also includes harmonic components of these signals and, in particular, as FIG. 4 shows, the 1/2 harmonic of the 150 Hz (75 Hz) and 2nd harmonic of the 90 Hz (180 Hz). Hence, in order in practice to achieve complete selection of the 90 and 150 Hz useful signals, it will be necessary for the frequency width of the observation window to be not greater than 15 Hz, this corresponding to a temporal width of 66.6 ms $$\left(\frac{1}{2T} = 7.5 \text{ Hz namely } T = \frac{1}{15} \text{ seconds}\right).$$

Figure 5:
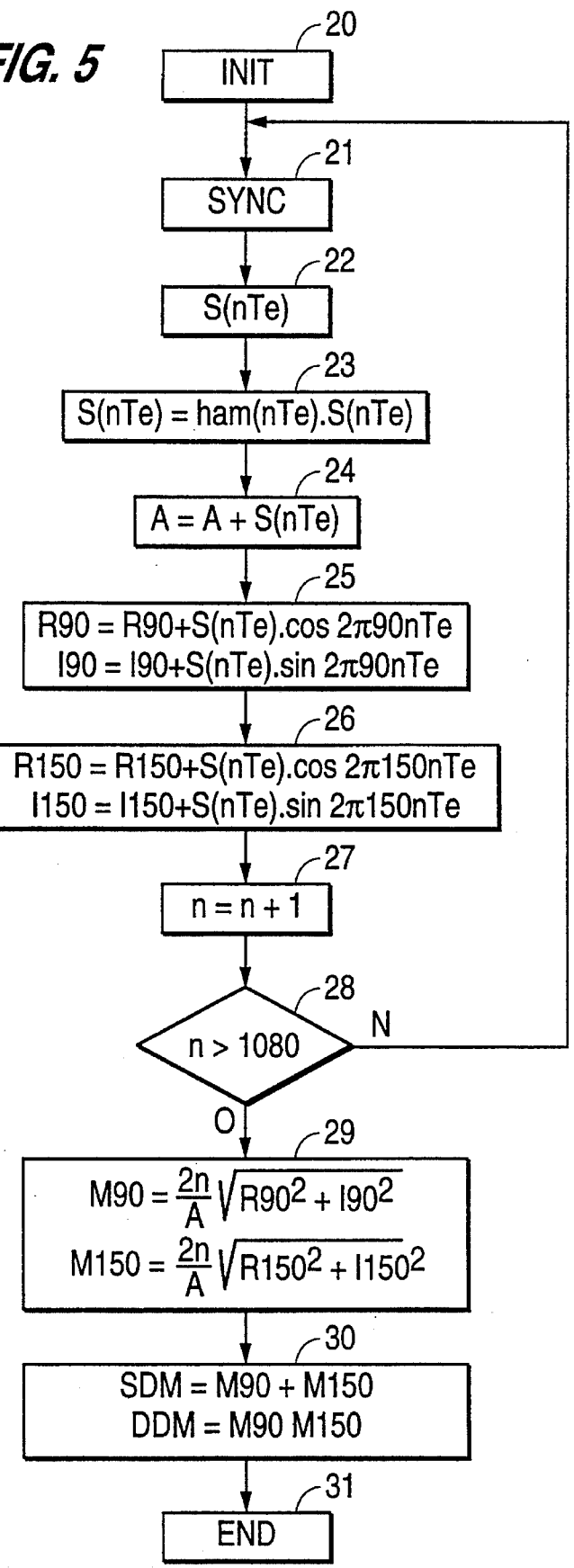
FIG. 5 is a flow chart describing the digital processing of the ILS signals in the device according to the invention.

FIG. 5 shows, in the form of a flow diagram, the various operations effected by the processing assembly 4 in order to determine the modulation difference DDM and sum of modulations SDM parameters characteristic of the analysed ILS signal.

These parameters depend on the modulation factors M90 and M150 which can be determined simply from the Fourier transform of the signal S(t).

Indeed, the modulus of S(F) for 90 HZ is equal to $$\frac{HF \times M90}{2}$$

and, for 150 Hz, it is equal to $$\frac{HF \times M150}{2},$$

the continuous component having modulus HF. It follows therefore that $$|S(90)| = \frac{HF \times M90}{2} \text{ and} |S(150)| = \frac{HF \times M150}{2}$$

or again $$M90 = \frac{2}{HF}(S(90)) = \frac{2}{HF}\sqrt{R^2(90) + I^2(90)}$$

and

-continued $$M150 = \frac{2}{HF}(s(150)) = \frac{2}{HF}\sqrt{R^2(150) + I^2(150)}$$

R(90), I(90), R(150), I(150) being the real and imaginary parts of the moduli of S(F) at the frequencies 90 and 150 Hz.

It is therefore expedient to determine these real R (F) and imaginary I (F) parts in order subsequently to recover the modulation factors simply. Now, R(F) and I(F) are given by the following formulae:

$$R(F) = \int_{-\infty}^{+\infty} S(t)\cos 2\pi Ft \, dt$$

$$I(F) = \int_{-\infty}^{+\infty} S(t)\sin 2\pi Ft \, dt$$

Which may also be written, taking into account the sampling and truncation, over the period T, afforded by the weighting window:

$$R(k) = \Sigma_N S(nTe) \cos 2\pi knTe$$

$$I(k) = \Sigma_N S(nTe) \sin 2\pi knTe$$

N being the number of samples taken over the period T, Te being the sampling period and n representing an integer number.

These calculations will be performed from each sample of the ILS signal and from tables stored in the non-volatile memory 14 and each containing a sequence of values defining a 90 or 150 Hz cosine or sine curve.

Figure 6:
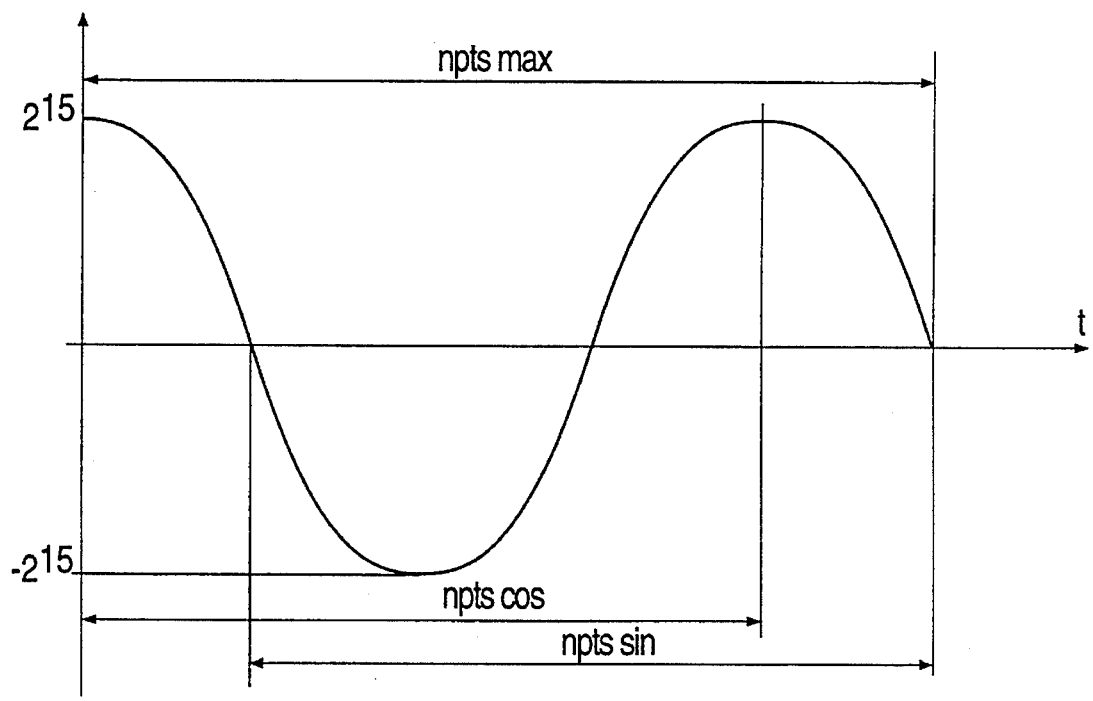
FIG. 6 shows one form of the signal stored in the tables of the device and utilized in the digital processing described in FIG. 4.

FIG. 6 shows an example of such a table. The values are stored in the table-in the form of 16-bit integers and therefore vary between $2^{15}$ and $-2^{15}$. Advantageously, each table, 90 or 150 Hz, will include a quarter sine period. Indeed, starting at the beginning of the table, a cosine is obtained over n points, whilst starting after the first quarter period, a sine is likewise obtained over n points.

The sampling frequency for the signal S(t) being fixed at 16.2 kHz, namely one acquisition of a sample every 61.728 µs, the number of samples taken over the duration of observation of the signal will be equal to 1080, this duration having been fixed beforehand at two periods of the ILS signal, namely 66.6 ms (15 Hz).

One period of the 90 Hz signal can then be described exactly on 180 points, (16200/90), the table then containing in total 225 points (1 period+¼ period). Similarly, one period of the 150 Hz signal can be described exactly on 108 points (16200/150), the table then containing a maximum of 135 points.

It may be noted that it is possible, by extracting from these tables only one point every two or three, to gather information about the 2nd or 3rd harmonic distortion factors existing in respect of the signal, when the latter does not take the form of a signal with ideal spectrum such as that represented in FIG. 3a.

Reference is again made to FIG. 5 which describes the program for calculating the modulation factors M90 and M150. It is a loop synchronized to the 16.2 kHz sampling signal.

After a first step 20, consisting in initializing the various parameters required for the calculations, the synchronization signal controlling the sampling of the signal S(t) is awaited in a second step 21. Upon reception of this command, step 22 undertakes the acquisition of a first sample S(nTe) with n=1, Te being the sampling period.

In a next step 23, the value of S(nTe) obtained is multiplied by the value of the weighting window at the corresponding instant am (nTe), this last value being extracted from a first table 140 containing predetermined values of the function Ham (t) for each sampling instant. A first determination of the continuous level HF, then equal to the amplitude A of the signal relating to the first sample acquired, is next undertaken in a step 24.

Step 25 carries out the calculation of the real and imaginary parts of the 90 Hz component of the ILS signal.

The real part R90 is given by multiplying the sampled and weighted value determined at the previous calculation by cos(nTe) and the imaginary part I90 by multiplying this value by sin(nTe), the values of cos(nTe) and sin(nTe) being extracted from a single 90 hz table 142.

Step 26 carries out an identical calculation for the 150 Hz component of the ILS signal, the values cos(nTe) and sin(nTe) being extracted from a single 150 Hz table 143.

The number of samples n is next incremented in step 27 and the preceding operations of steps 21 to 26 may be restarted for a new sample and so on until completion, at step 28, of the observation time which is advantageously limited to 66.6 ms, namely exactly 1080 points of the signal S(t).

The modulation factors are then calculated at step 29 through the following formulae already described:

$$M90 = \frac{2}{HF}(S(90)) = \frac{2n}{A}\sqrt{R^2(90) + I^2(90)}$$

and $$M150 = = \frac{2}{HF}(S(150)) = \frac{2n}{A}\sqrt{R^2(150) + I^2(150)}$$

the ratio A/n giving the average value HF of the signal s(t).

Finally, in step 30, prior to the end-of-processing step 31, the difference and sum of the modulations DDM and SDM are determined by differencing or summing the modulation factors calculated in the preceding step 29. These data will advantageously be delivered on twelve bits.

It is fundamental to note that the sampled signal is not stored in any way, the calculations being effected during the period separating two acquisitions of the signal. The method is carried out in real time and therefore requires no significant memory capacity. Thus, the random-access memory containing in particular the conversion result may be just 256 bytes.

These calculations having to be carried out between two sampling instants, namely 61.728 µs, the processing unit will preferably permit calculations on 16 and 32-bit integers as well as in floating point. Operation at 16 MHz will advantageously be envisaged without this frequency of calculation being limiting.

FIG. 7 describes, with the aid of a flow chart, the analysis of the 1020 Hz identification signal.

This signal is an audio wave modulated according to morse code and superimposed on the ILS localizing signal.

In this case, the signal S(t) will therefore have a spectral component slightly different to that of FIG. 3b with, in addition, in particular a line at the frequency of 1020 Hz of amplitude $$\frac{HF \times M1020}{2}.$$

It is therefore possible, by adopting the principles defined for calculation of the 90 and 150 Hz modulation factors, to evaluate the 1020 Hz modulation factor also. However, with the identification signal being able to vary within a range of ±50 Hz with respect to its nominal value of 1020 Hz, the Hamming window defined earlier no longer allows valued gathering of the amplitude of this frequency line.

It is necessary to define a new weighting window which will allow a filtering of the 1020 Hz frequency line with a pass-band of at least 100 Hz and if possible a virtually non-existent ripple.

Figure 8:
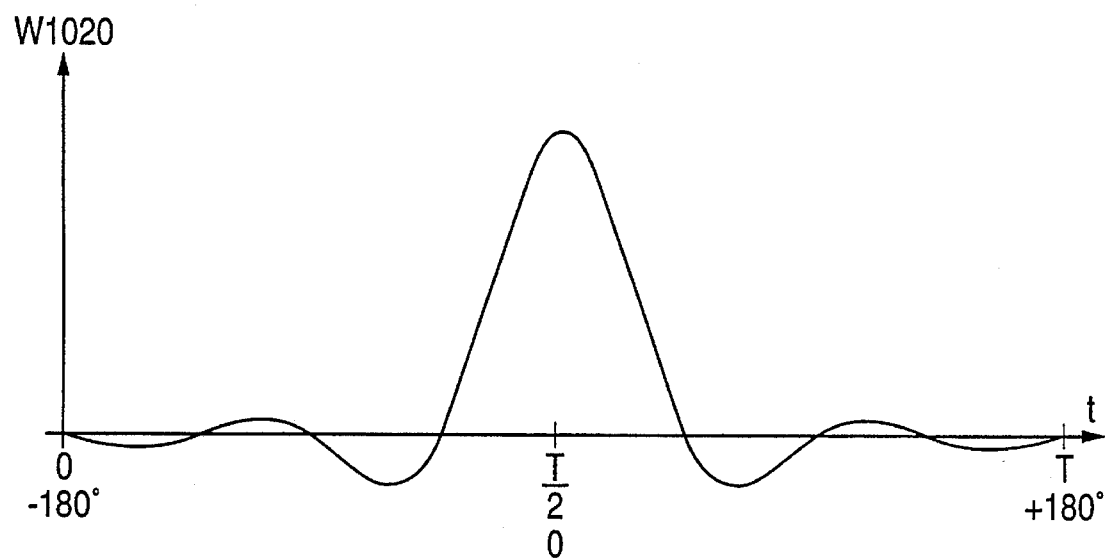
FIG. 8 represents, in the time domain, a "weighting window" function employed in the processing of the identification signal.

FIG. 8 shows the weighting window developed for filtering the 1020 Hz component.

This window has a damped (sin n)/n shape resulting from combining a (sin n)/n function with a Hamming function. The equation of this window function is given by:

$$W1020(t) = 2\frac{\sin k'\theta}{\theta}[\alpha + (1-\alpha)\cos\theta]$$

with $$\theta = \frac{2\pi t}{T}$$

where T represents the duration of observation and α advantageously being chosen equal to 0.54 and k' is equal to 4.

Figure 9:
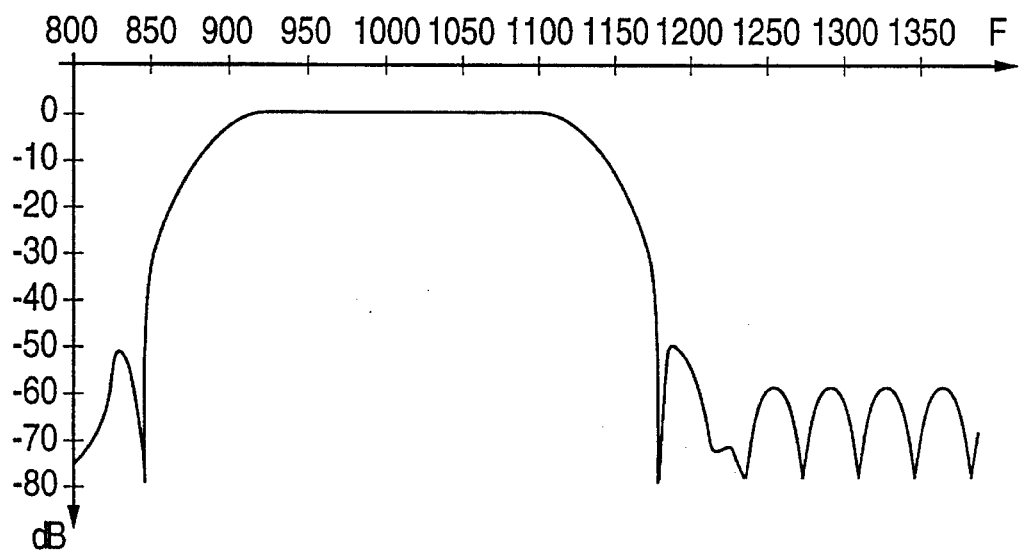
FIG. 9 represents the frequency response of the digital filter corresponding to the weighting window of FIG. 8.

The application of this specific window W1020(t) to the sampled signal S*(t) defines a digital filter whose frequency response is represented in FIG. 9, and in which can be noted the absence of ripple in the passband as well as the steepness of the edges of this filter, which clearly shows its very high selectivity.

Reference is again made to FIG. 7 which explains the calculation of the modulation factor M1020. As for the determination of the M90 and M150 factors, the calculation is carried out in a 16.2 kHz synchronized loop.

After a first step 40 for initializing various parameters of calculation, the synchronization signal controlling the sampling and therefore the analog/digital conversion of the ILS signal is awaited in a second step 41. Having received this conversion command, the acquisition of the first sample is undertaken in a step 42, and then, in a step 43, the value of this sample is multiplied by the value of the aforesaid weighing window W1020 for this sampling instant, this latter value being extracted from a second table 141 containing all the values defining the function W1020(t). A first determination of the continuous level HF is next undertaken in a step 44. The next step 45 carries out the calculation of the real and imaginary parts of the 1020 Hz component via the product of the sampled and weighted value times values extracted from a single 1020 Hz table 144 delivering cosine and sine values for each sampling instant. A new evaluation is then possible after passing, in step 46, to a next sample, these calculations being performed throughout the duration of observation, that is to say over 1080 points (step 47).

The modulation factor can then be calculated, in step 48, from the values of R(1020) and I(1020) and from the continuous component HF, step 49 terminating the processing of the 1020 Hz component. The 1020 Hz modulation factor is, like the values DDM and SDM, advantageously delivered on 12 bits.

It may be noted that the contents of the sin/cos 1020 table (and likewise for the 90 and 150 Hz tables) can be accessed very easily by using two pointers, one moving cyclically over the first n points of the table, thus defining the cosine function, and the other moving cyclically over n points starting from the first quarter period of this table, in order to define the sine function.

Contrary to the 90 and 150 Hz tables from which each period can be defined with an integer multiple of the sampling period, one period of the 1020 Hz table is not equal to an integer number times this sampling period (16200/1020=15.882). Hence, the closest integer, namely 16, will be chosen to define one period of the identification signal, this in practice reducing the frequency of this signal to 1012.5 Hz, a value which still lies within the admissible range of variation (1020±50 Hz).

This results in the 1020 Hz table containing 16+4 namely 20 points in total.

It is clear that the structure thus described allows very accurate calculations, all the more so since these calculations are synchronized with the signal via the phase-lock loop synchronization assembly. Constant positioning on the maximum of the main lobes is thus assured as is therefore, correspondingly, the avoidance of any amplitude error prejudicial to the determination of the modulation factors and hence to the definition of the tracking and glide paths.

Furthermore, the accuracy in the determination of the parameters DDM and SDM is heightened further through the fact that the measurement is carried out from the real modulation factors defined, like the ratio of the amplitudes of the modulating signals, with respect to the amplitude of the carrier, and not by regarding the latter amplitude as constant and then evaluating solely the amplitude of the modulating signals, as was customary in the prior art methods, in particular in the patents described at the start of the description.

I claim:

1. Instrument landing system (ILS) signal analysis device including an analog/digital converter receiving the composite signal to be analysed and delivering a succession of values which can be processed in digital form, characterized in that in order to undertake the determination of the modulation factor for the identification signal contained in the ILS signal, it includes a digital filter using a weighting function whose equation is given by the following relation:

$$W(t) = 2\frac{\sin k'\theta}{\theta}[\alpha + (1-\alpha)\cos\theta] \text{ with } \theta = \frac{2\pi t}{T}$$

and which carries out an extraction of this signal for identification of the ILS signal delivered by the converter, where T represents the duration of observation of the signal to be analysed and k' and α are specified numerical coefficients.

2. ILS signal analysis device according to claim 1, characterized in that the coefficient α is equal to 0.54 and the coefficient k' is equal to 4.

3. The ILS signal analysis device according to claim 1, wherein transfer function is stored in digital form in a table contained in a non-volatile memory of a processing assembly carrying out the digital processing of the values from the analog/digital converter.

4. An instrument landing system (ILS) signal analysis method, comprising the steps of:

a) acquisition of a sample S(nTe) of the ILS signal to be analyzed by the analog/digital conversion of this signal, Te representing the sampling period and n being an integer number, the sampling frequency being greater than the largest of the frequencies k of the components of the signal to be analyzed, b) multiplication of the value of the sample taken by a first numerical value corresponding to the value of a weighting window function at the acquisition instant:

$$S(nTe) = Fen(nTe) \times S(nTe)$$

c) determination, at the frequencies k of the characteristic components of the ILS signal, of the real and imaginary parts of the spectrum of the sampled and weighted signal S(t):

$$R(k) = R(k) + S(nTe) \times \cos 2\pi k\, nTe$$

and $$I(k) = I(k) + S(nTe) \times \sin 2\pi k\, nTe$$

d) repetition of steps a) to c) for all of the samples over a duration of observation T of the ILS signal, e) calculation of the modulation factors for the characteristic components of the ILS signal.

$$M(k) = \frac{2}{HF} \sqrt{R^2(k) + I^2(k)}$$

HF being the average value of S(nTe) calculated over all the samples taken.

5. ILS signal analysis method according to claim 4, characterized in that it furthermore includes the following step:

f) calculation of the difference (DDM) and sum (SDM) of the modulations (M (90) and M(150)) of the 90 and 150 Hz components of the ILS signal:

$$SDM = M(90) + M(150) \text{ and } DDM = M(90) - M(150).$$

6. ILS signal analysis method according to claim 4, characterized in that the said weighting window function is a Hamming function.

7. ILS signal analysis method according to claim 4, characterized in that the said window function is a function corresponding to the following equation:

$$W(t) = 2\frac{\sin k'\theta}{\theta}[\alpha + (1-\alpha)\cos\theta] \text{ with } \theta = \frac{2\pi t}{T}$$

T being the duration of observation, k' and $\alpha$ being specified constants.

8. ILS signal analysis method according to claim 7, characterized in that the coefficient $\alpha$ is equal to 0.54 and the coefficient k' equal to 4.

9. ILS signal analysis method according to claim 4, characterized in that in order to undertake the determination of the harmonics of order r of the characteristic components of the ILS signal, the calculation of the real and imaginary parts of the spectrum of the weighted signal S*(t) carried out at step c) is modified as follows:

$$R(k) = R(k) + S(nTe) \times \cos 2\pi krnTe$$

$$I(k) = I(k) + S(nTe) \times \sin 2\pi krnTe$$

10. ILS signal analysis method according to claim 4, characterized in that the said functions cos 2$\pi$knTe and sin 2$\pi$knTe are stored in the form of tables of values, n varying from 1 to N, N being the total number of samples taken over the duration of observation T.

* * * * *